(12) United States Patent
Zwerver

(10) Patent No.: US 6,420,836 B1
(45) Date of Patent: Jul. 16, 2002

(54) SWITCHING ARRANGEMENT

(75) Inventor: Hendrik Jan Zwerver, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/833,411

(22) Filed: Apr. 12, 2001

(30) Foreign Application Priority Data

May 24, 2000 (EP) .......................................... 00201842

(51) Int. Cl.[7] .............................................. H05B 37/02
(52) U.S. Cl. ........................ 315/219; 315/224; 315/307
(58) Field of Search ................ 315/219, 224, 315/307, 308

(56) References Cited

U.S. PATENT DOCUMENTS

| | | | | |
|---|---|---|---|---|
| 4,611,150 A | * | 9/1986 | Ball et al. ................... | 315/307 |
| 4,668,905 A | | 5/1987 | Schierjott ................... | 323/287 |

FOREIGN PATENT DOCUMENTS

| | | |
|---|---|---|
| DE | 4422399 A1 | 1/1996 |
| EP | 0746186 | 12/1996 |

\* cited by examiner

*Primary Examiner*—David Vu

(57) ABSTRACT

Switching arrangement for igniting and operating of a high-pressure discharge lamp which is provided with:
- input terminals for connecting a power source,
- output terminals for connecting the lamp which is ignited and operated by the arrangement,
- a flyback converter having a semiconductor switching element and a transformer of which a primary coil is electrically connected to one of the input terminals and a secondary coil having a secondary coil voltage is connected to one of the output terminals,
- a control circuit for generating a switching signal for control of the semiconductor switching element in a conducting or a non-conducting switching state,
- element M for generating a control signal S intended for the control circuit, which signal S depends on the secondary coil voltage and on a current through the secondary coil.

8 Claims, 2 Drawing Sheets

SWITCHING ARRANGEMENT

BACKGROUND OF THE INVENTION

The invention relates to a switching arrangement for igniting and operating a high-pressure discharge lamp, the switching arrangement comprising:

input terminals for connecting a power supply source, output terminals for connecting the lamp to be operated, a flyback converter comprising a semiconductor switching element and a transformer, a primary winding of which is electrically connected to one of the input terminals and a secondary winding having a secondary winding voltage is electrically connected to one of the output terminals, a control circuit for generating a switching signal for controlling the semiconductor switching element in a conducting or a non-conducting switching state.

A switching arrangement of the type described in the opening paragraph is known from EP 0 746 186. The known switching arrangement is suitable for igniting and operating a car headlamp. The lamp may be directly connected to the output terminals. However, the lamp is usually incorporated in a commutation network in the form of, for example, a bridge circuit which in its turn is connected to the output terminals.

The switching arrangement comprises means for detecting the lamp current and the lamp voltage. The power consumption of the lamp is determined by means of the signals thus detected and is subsequently used as a control signal for controlling the semiconductor switching element of the flyback converter. The lamp is thus power-controlled.

The known switching arrangement has the drawback that information about the current through the primary winding of the transformer is obtained by means of a separate measuring resistor in series with the semiconductor switching element. This leads to large losses. Another way of detecting the current through the primary winding is the use of a current transformer. This has the drawback that a transformer is relatively large and impedes the miniaturization of the switching arrangement.

SUMMARY OF THE INVENTION

It is an object of the invention to provide a measure eliminating the drawback described.

According to the invention, the switching arrangement of the type described in the opening paragraph is characterized in that it comprises means M for generating a control signal S for the control circuit in dependence upon the secondary winding voltage and a current through the secondary winding.

The switching arrangement according to the invention has the surprising advantage that a direct current measurement by the primary winding can be dispensed with. In an advantageous embodiment of the switching arrangement, the means M comprise a sense circuit for generating a signal S1 in dependence upon the secondary winding voltage. The means M preferably also comprise a current-sense circuit for detecting a current through the secondary winding. It is then advantageous if the current-sense circuit is connected to an output of the sense circuit by means of a sample & hold switching circuit. It is thus relatively easily possible to correct the signal S1 for the occurrence of a DC voltage across the secondary winding. In an advantageous embodiment, this is realized in that the switching arrangement comprises a switching element which is alternately switched to a conducting and a non-conducting state by means of an inverted switching signal of the control circuit.

An advantageous embodiment of the sense circuit is constituted by a capacitive sense element which is connected to the secondary winding by means of an impedance. A main electrode of the switching element is preferably-connected between the capacitive sense element and the impedance. In this way, the desired control signal is formed by means of a relatively simple construction of the means M. This contributes to the miniaturization of the switching arrangement.

In an advantageous embodiment of the switching arrangement according to the invention, the control circuit for generating a switching signal for controlling the. semiconductor switching element comprises means for maximizing, with respect to time, a switching state of the semiconductor switching element. It is thereby achieved that the time during which the semiconductor switching element is in the conducting or non-conducting state is limited under circumstances of, for example, a very low lamp voltage or a relatively low power supply voltage.

These and other aspects of the invention are apparent from and will be elucidated with reference to the embodiments described hereinafter.

DESCRIPTION OF THE PREFERRED EMBODIMENT

Figure 1:
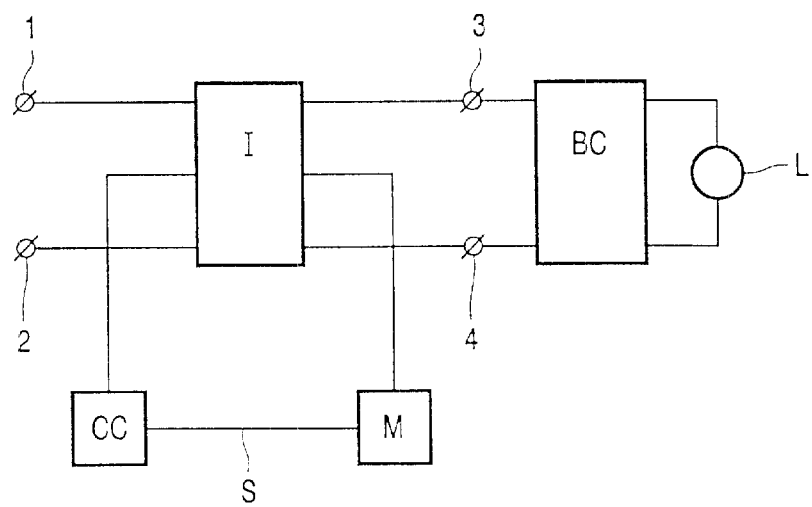
FIG. 1 is a circuit diagram of a switching arrangement according to the invention.

In FIG. 1, the reference numerals 1, 2 denote input terminals for connecting a power supply source, and 3, 4 denote output terminals for connecting the lamp L to be operated. The reference I denotes a flyback converter which is shown in greater detail in FIG. 2. The switching arrangement also comprises a control circuit CC and means M for generating a control signal S for the control circuit CC. In the embodiment described, the lamp is incorporated in a bridge circuit BC which is connected to the output terminals 3,4.

Figure 2:
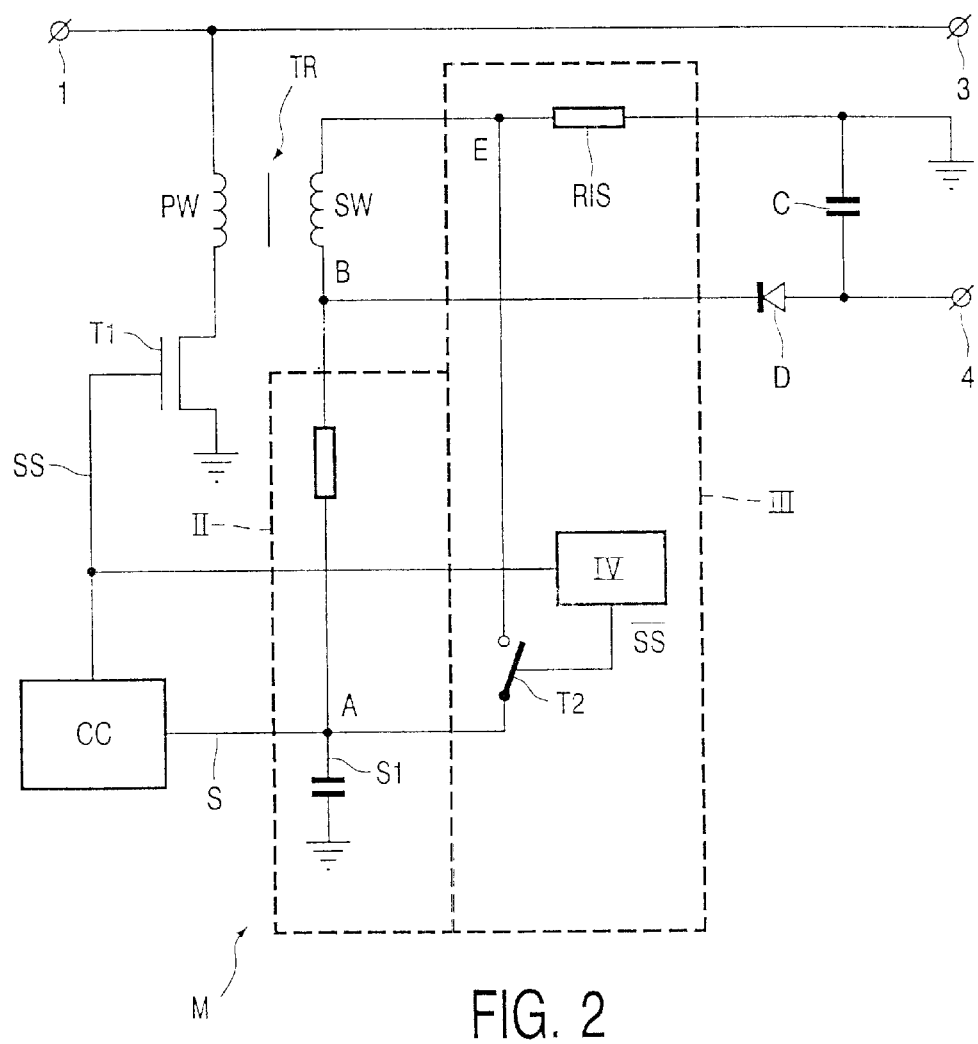
FIG. 2 shows, in detail, a flyback converter of the arrangement shown in FIG. 1.

In FIG. 2, TR denotes a transformer of the flyback converter I, a primary winding PW of which is electrically connected to one of the input terminals 1, and a secondary winding SW having a secondary winding voltage is electrically connected to one of the output terminals 4.

A semiconductor switching element of the flyback converter I is denoted by T1. The semiconductor switching element T1 is alternately switched to a conducting and a non-conducting state by means of a switching signal SS which is generated in the control circuit CC. The flyback converter also comprises a diode D and a buffer capacitor C.

Figure 3:
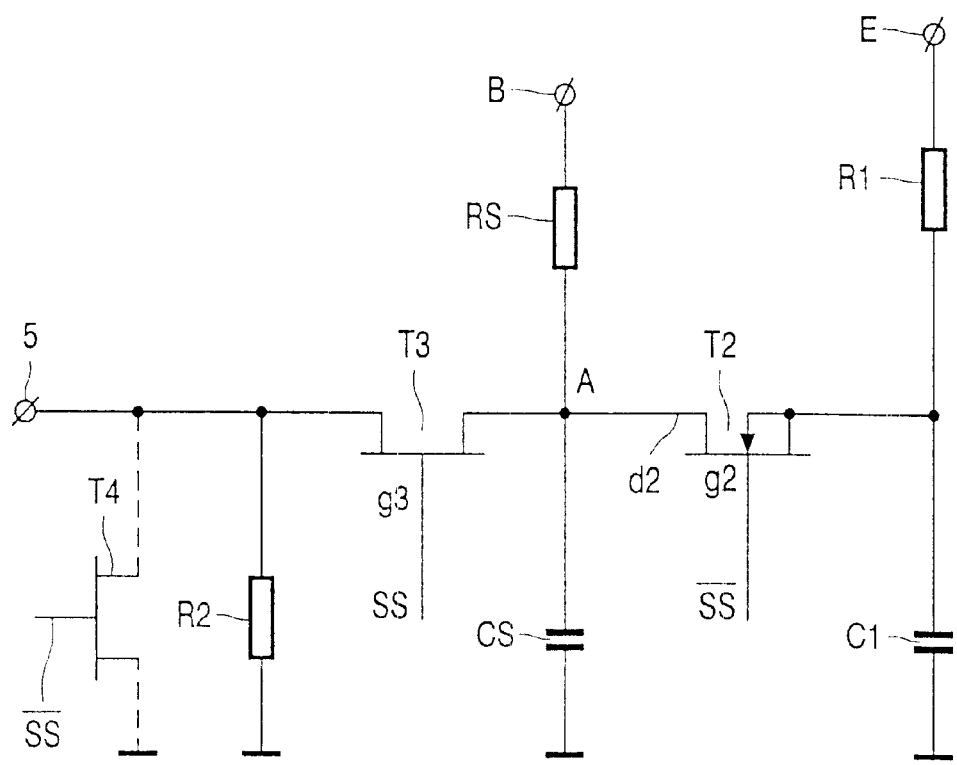
FIG. 3 shows means M in detail.

In FIGS. 2 and 3, the means M are shown in greater detail. They comprise a sense circuit II for generating a signal S1 at an output 5 in dependence upon the secondary winding voltage, and a current-sense circuit III for detecting a current through the secondary winding SW. At point B, the sense circuit H is connected to one end of the secondary winding. At point E, the current-sense circuit II is connected to the other end of the secondary winding and is connected to the sense circuit by means of a sample & hold switching circuit constituted by switching element T2. A control electrode g2 of the sample & hold switching element T2 is electrically connected via an inverter circuit IV to the switching signal SS of the control circuit CC for alternately switching to a conducting and a non-conducting state by means of an inverted switching signal $\overline{SS}$ of the control circuit.

In the embodiment described, the sense circuit II comprises a capacitive sense element, in the form of a capacitor CS, which is connected to the secondary winding SW by means of an impedance, in the form of a resistor RS. Resistor RS and the capacitor CS thus form a series circuit. The value of the resistor RS determines the value of the voltage across the capacitor CS. For a considerably linear relation between the voltage across the capacitor CS and the secondary winding voltage, the capacitor voltage is relatively small and is preferably not more than 10% of the secondary winding voltage. Point A constitutes the junction point between resistor RS and capacitor CS and also the junction point with the output 5. Point A is also connected to a main electrode d2 of the switching element T2, which functions as a sample & hold switching circuit and forms part of the current-sense circuit YIN. The current-sense circuit further comprises a measuring impedance RIS in series with the secondary winding SW. A relatively low value of the voltage across the capacitor CS also results in a small dissipation in the measuring impedance RIS. A high-frequency filter in the form of, for example, an RC combination R1,C1 may be used.

In the embodiment of the means M shown in FIG. 3, a switching element T3 is arranged between point A and output 5 in the sense circuit II, which switching element has a gate electrode g3 connected to the switching signal SS of the control circuit CC for alternately switching the switching element T3 to a conducting and a non-conducting state. Output 5 is also connected to ground by means of a resistor R2. Use of the switching element T3 together with the resistor R2 has the advantage that the signal formed at the output 5 is a true image of the variation of the current through the primary winding PW of the transformer TR. To reduce dissipation, the resistor R2 may be replaced by a switching element T4 (connections shown by means of broken lines in the Figure) which is switched with the inverted switching signal $\overline{S}\,\overline{S}$ of the control circuit.

The control circuit CC also comprises means in the form of two timers by which the time during which the semiconductor switching element is conducting and the time during which it is non-conducting is limited to a maximum.

The switching elements T2, T3 and T4 can be joined with parts of the control circuit CC to form an integrated circuit.

A practical realization of the embodiment described is suitable for igniting and operating a car headlamp comprising a high-pressure discharge lamp of the types D2R and D2S, manufactured by Philips and having a nominal power of 35W.

What is claimed is:

1. A switching arrangement for igniting and operating a high-pressure discharge lamp, the switching arrangement comprising:

input terminals for connection of a power supply source, output terminals for connection of the lamp to be operated, a flyback converter comprising a semiconductor swishing element and a transformer, a primary winding of which is electrically connected to one of the input terminals and a secondary winding having a secondary winding voltage is electrically connected to one of the output terminals, a control circuit for generating a switching signal to control the semiconductor switching element in a conducting or a non-conducting switching state, means M for generating a control signal S for the control circuit in dependence upon the secondary winding voltage and a current through the secondary winding.

2. A switching arrangement as claimed in claim 1, characterized in that the means M comprise a sense circuit for generating a signal S1 in dependence upon the secondary winding voltage.

3. A switching arrangement as claimed in claim 1 or 2, characterized in that the means M comprise a current-sense circuit for detecting a current through the secondary winding.

4. A switching arrangement as claimed in claim 3, characterized in that the current-sense circuit is connected to an output of the sense circuit by means of a sample and hold switching circuit.

5. A switching arrangement as claimed in claim 4, characterized in that the sample and hold switching circuit comprises a switching element which is alternately switched to a conducting and a non-conducting state by means of an inverted switching signal of the control circuit.

6. A switching arrangement as claimed in claim 2, characterized in that the sense circuit comprises a capacitive sense element which is connected to the secondary winding by means of an impedance.

7. A switching arrangement as claimed in claim 6, characterized in that a main electrode of the switching element is connected between the capacitive sense element and the impedance.

8. A switching arrangement as claimed in claim 1, characterized in that the control circuit for generating a switching signal for controlling the semiconductor switching element comprises means for maximizing, with respect to time, a switching state of the semiconductor switching element.

\* \* \* \* \*